(12) United States Patent
Kessler et al.

(10) Patent No.: US 7,398,386 B2
(45) Date of Patent: Jul. 8, 2008

(54) TRANSPARENT IPSEC PROCESSING INLINE BETWEEN A FRAMER AND A NETWORK COMPONENT

(75) Inventors: Richard E. Kessler, Shrewsbury, MA (US); Muhammad R. Hussain, Pleasanton, CA (US)

(73) Assignee: Cavium Networks, Inc., Mountain View, CA (US)

( * ) Notice: Subject to any disclaimer, the term of this patent is extended or adjusted under 35 U.S.C. 154(b) by 855 days.

(21) Appl. No.: 10/411,909

(22) Filed: Apr. 12, 2003

(65) Prior Publication Data

US 2004/0205336 A1 Oct. 14, 2004

(51) Int. Cl.
G06F 21/00 (2006.01)
G06F 15/16 (2006.01)
H04L 9/00 (2006.01)
H04K 1/00 (2006.01)

(52) U.S. Cl. .................................. 713/150; 726/14
(58) Field of Classification Search ........................ None
See application file for complete search history.

(56) References Cited

U.S. PATENT DOCUMENTS

| | | | |
|---|---|---|---|
| 6,253,321 B1 * | 6/2001 | Nikander et al. | 713/160 |
| 6,327,625 B1 * | 12/2001 | Wang et al. | 709/235 |
| 6,678,734 B1 * | 1/2004 | Haatainen et al. | 709/230 |
| 6,708,218 B1 * | 3/2004 | Ellington et al. | 709/236 |
| 7,000,120 B1 * | 2/2006 | Koodli et al. | 713/1 |
| 7,028,332 B1 * | 4/2006 | Jason, Jr. | 726/1 |
| 7,028,335 B1 * | 4/2006 | Borella et al. | 726/11 |
| 7,107,614 B1 * | 9/2006 | Boden et al. | 726/15 |
| 7,131,137 B1 * | 10/2006 | Jason et al. | 726/1 |
| 7,155,740 B2 * | 12/2006 | Brustoloni | 726/15 |
| 2002/0042875 A1 | 4/2002 | Shukla | |
| 2003/0037235 A1 * | 2/2003 | Aziz et al. | 713/160 |
| 2003/0200456 A1 * | 10/2003 | Cyr et al. | 713/200 |

FOREIGN PATENT DOCUMENTS

WO PCT/US2004/009738 3/2005

OTHER PUBLICATIONS

"Understanding the IPSec Protocol Suite", Mar. 2000, Alcatel, p. 1-28.*
Thayer et al, "IP Security Document Roadmap", Nov. 1998, Network Working Group Request for Comments: RFC 2411, p. 1-11.*
"Understanding the IPSec Protocol Suite", Oct. 2000, Alcatel Internetworking, Inc., p. 1-45.*
R. Thayer, N. Doraswamy, R. Glenn; RFC2411; http://rfc.net/rfc2411.html; Nov. 1998; 11 pages.
"Understanding the IPSec Protocol Suite," Mar. 2000; 28 pages; Alcatel.
"Understanding the IPSec Protocol Suite," Oct. 2000, 44 pages; Alcatel.

* cited by examiner

*Primary Examiner*—Christopher A Revak
(74) *Attorney, Agent, or Firm*—Blakely, Sokoloff, Taylor & Zafman, LLP

(57) ABSTRACT

A method and apparatus for transparent processing of IPsec network traffic by a security processor in line between a framer and a network processor. Security processor parses packet header and tail information to determine if encryption or decryption is required. After encryption or decryption is completed packet header and tail information is modified to reflect the changes in the packet such as length of the packet. The modified packet is then passed on to the network processor or framer.

24 Claims, 8 Drawing Sheets

TRANSPARENT IPSEC PROCESSING INLINE BETWEEN A FRAMER AND A NETWORK COMPONENT

BACKGROUND

1. Field of the Invention

The invention relates to field of network processing. Specifically, this invention relates to the inline processing of network traffic by a security processor between a framer device and a network processor.

2. Background

Communication networks and the number of users of such networks continue to increase. On-line sales involving both business-to-business and business to consumer over the Internet continues to proliferate. Additionally, the number of people that are telecommuting continues to grow. Both on-line sales and telecommuting are examples of usage of communication networks that typically involve private and sensitive data that needs to be protected during its transmission across the different communication networks.

Accordingly, security protocols, (e.g., Transport Layer Security (TLS), Secure Sockets Layer (SSL) 3.0, Internet Protocol Security (IPSec), etc.), have been developed to establish secure sessions between remote systems. These security protocols provide a method for remote systems to establish a secure session through message exchange and calculations, thereby allowing sensitive data being transmitted across the different communication networks to have a measure of security and/or untamperability.

These security protocols utilized encryption to protect the content of the messages sent between machines and network devices. In some instances, it is necessary that a network device handling a message decrypt at least a portion of the message in order to process the message, such as determining the message destination. Decryption algorithms often require significant processing resources. This puts a strain on network processors in a network device. A network processor often receives incoming packets from a framer, which is a device that is designed to receive frames of a specified format such as an Ethernet frame specified by IEEE 802.3. Framing devices are typically simple circuits capable of little but receiving and transmitting frames.

IPsec is a security framework for Internet Protocol (IP) networking that provides security services, including access control, integrity, authentication, protection against replay, confidentiality and similar services. IPsec utilizes a security association (SA) to implement its services. An SA is a simplex connection that is protected by one or more of the security services. An SA may be established between a pair of hosts, between a host and a security gateway, such as a router, or between a pair of gateways. IPsec connections between two peers consist of a pair of SAs as an SA is unidirectional. An SA contains all the information required to execute the security services of a IPsec packet. When created, an SA is assigned a security parameters index (SPI) by a receiving machine. A combination of the SPI and the destination IP addresses uniquely identifies an SA. A receiving host uses this information to determine which SA an incoming packet belongs to, and thus which algorithms for decryption and packet processing to apply to the packet. On the transmit side, the host performs a lookup based on the IP header information to find the SA to be used for encryption and packet processing.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
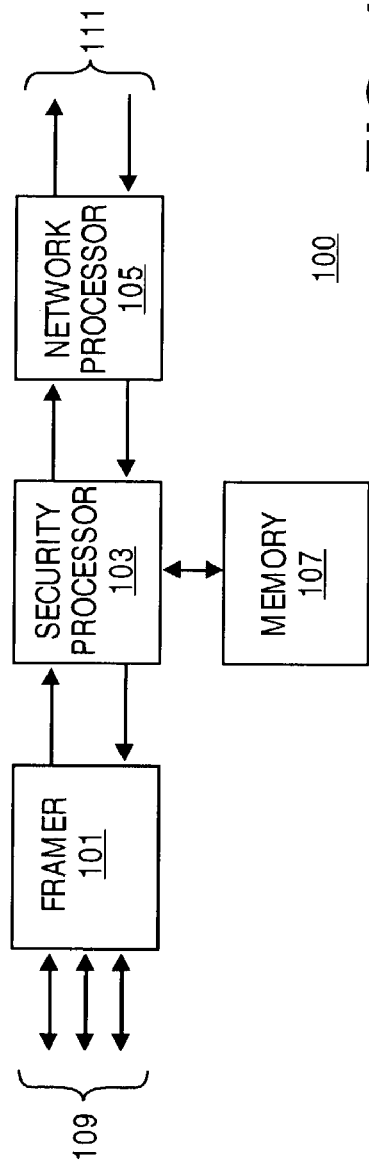
FIG. 1 is an inline security processor system.

FIG. 1 is a block diagram of a network device 100. Network device 100 includes a framer device 101 connected to a physical layer 109 such as Ethernet, token ring or similar network. Framer 101 can transmit or receive frames over the physical layer connection 109. Framer 101 is directly connected to security processor 103. Security processor 103 receives packets from framer 101 and examines them to determine if they contain encrypted data that needs to be decrypted before being passed on to the network processor 105. Security processor 103 is connected to a set of memory devices 107. Memory device 107 may function as a working memory for performing operations and storing data relating to the processing of packets.

Network processor 105 examines incoming packets from framer 101 to determine if they need to be forwarded and receives packets that are outbound via framer 101 and physical connection 109 from a computer system or switch fabric. Network processor 105 may be connected via a bus 111 or similar communication medium to a switch fabric in a network device. In another embodiment, network processor maybe part of a computer system or similar system.

Inbound packets flow from the framer 101 into the security processor 103. Security processor 103 decrypts the packet if necessary and forwards the packets to the network processor 105. Outbound packets often flow from the network processor 105 to the security processor 103,which encrypts the packet. Security processor 103 then forwards the encrypted packet to framer 101 to transmit over physical layer 109.

In one embodiment, security processor 103 can handle multi-port SPI interfaces with the framer 101 and network processor 105. In another embodiment, security processor may receive input from other bus or input mechanisms such as PCI, PCI-Express or similar systems. Security processor 103 can perform IPv4 and IPv6 transformations including IPv4 and IPv6 ESP/AH, UDP-encapsulated ESP, tunnel and transport. Security processor 103 can perform IPsec exception detection and accumulate statistics on traffic and processing in the security processor 103. Security processor 103 may be used half-duplex or full duplex. In one embodiment, another network processor is placed between the security processor 103 and framer 101, for example to do segmentation and reassembly (SAR) with an asynchronous transfer mode (ATM) device.

When handling IPsec traffic, security processor 103 utilizes complete security association (SA) information that comes from either one of two sources the request header of an input packet, which can specify the complete security association context directly and from the security parameters index (SPI) value in an inbound packet on an IPsec decrypt that destination matches.

Figure 2A:
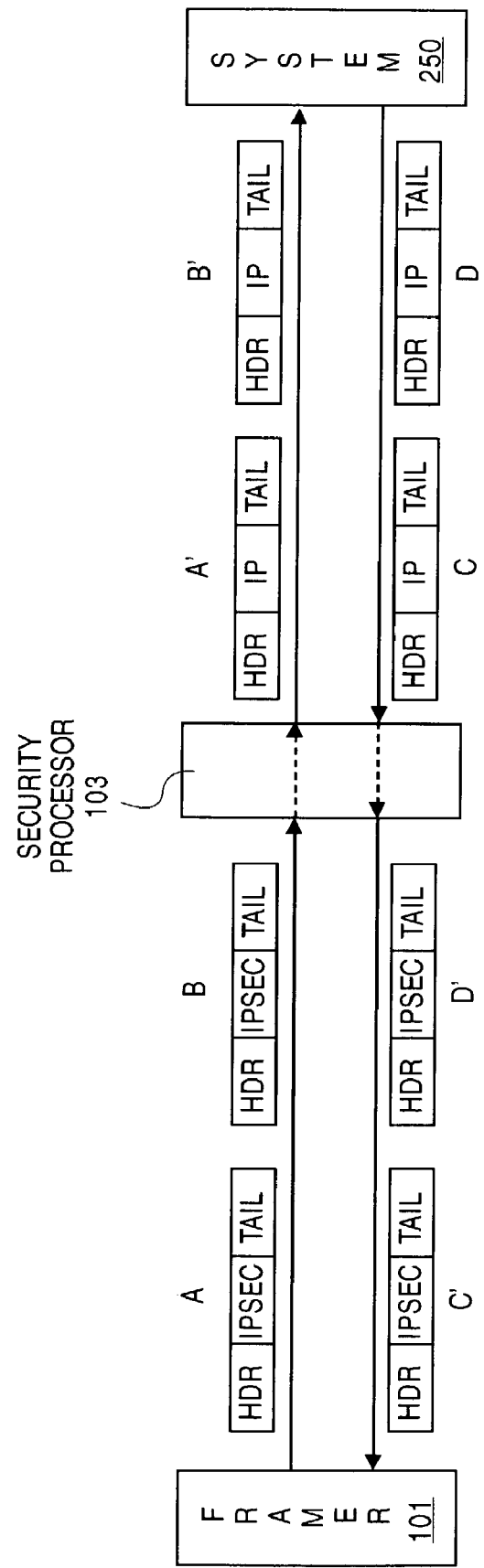
FIG. 2A is a diagram of transparent packet processing.

FIG. 2A is a block diagram illustrating the transparent processing of packets by security processor 103. In one embodiment, security processor is 'in line', with a framer 101 and the rest of a system 250. The system may be a network device, computer system or similar system. Framer 101 and system 250 are configured to receive and send standard IP and IPsec packets. Packets A and B are outbound packets destined for framer 101 and subsequent transmission on a network. Packets C and D are inbound packets received by framer 101 and destined for system 250.

In one embodiment, security processor 103 converts inbound IPsec packets to standard IP packets and outbound IP packets to IPsec packets. In another embodiment, security processor could sit in any position on a line of communication between components where an IPsec-IP or IP-IPsec conversion is needed. Security processor 103 can be situated 'in line' because its conversion process is transparent and does not terminate other protocol layers. Thus, other packet data is not corrupted by the conversion process and the packet does not lose any addressing or metadata, e.g., segment lengths, in the conversion process.

For example, incoming packets A and B include header (HDR) information, an IPsec segment, and tail data. These packets are processed by security processor 103 to convert the IPsec segment to standard IP and continue on to their destination. The header and tail data for other protocol layers is not terminated, i.e., lost or removed. Rather, the protocol information is maintained and if necessary updated to prevent packet corruption due to the change in length and content during the conversion process. Packets A' and B' include a IP segment decrypted from IPsec segment of packets A and B. Header and tail data for A' and B' are updated to reflect any necessary changes without terminating the other protocol layers.

Similarly, packets C and D are outbound IP packets, which are encrypted by security processor 103 to create packets C' and D'. C' and D' include an IPsec segment that encrypt the IP segment data of packets C and D. C' and D' maintain header data and tail data that may be modified to reflect changes in the size and content of each packet. Framer 101 would receive and transmit packets C' and D' without knowledge that the packets were originally in standard IP form.

Figure 2B:
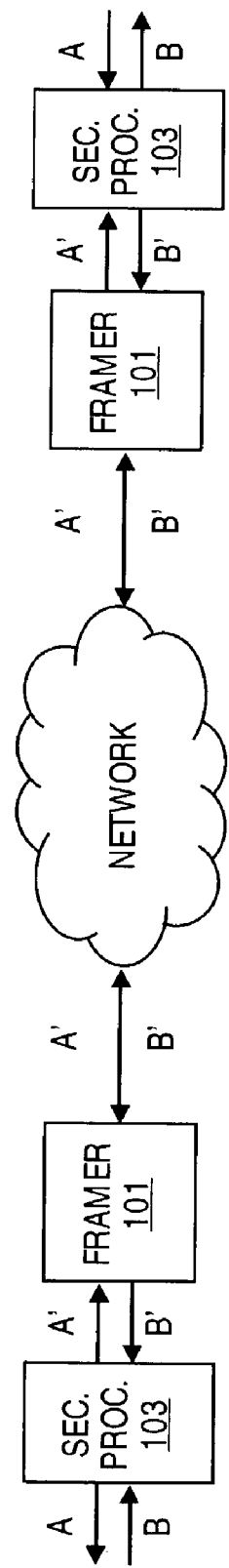
FIG. 2B is a diagram of transparent packet processing across a network.

FIG. 2B illustrates an exemplary network system having security processors 103 adjacent framers 101 at each end of a network path. Packet A, is an IP packet traveling across the network from a first computer system or network device to a second system or network device over a network, e.g., an Ethernet network, token ring network or similar network. In one embodiment, packet A is encrypted by security processor 103 into an IPsec packet A'. A' travels over the network to a framer 101 and security processor at the destination system and is decrypted to the original packet A. Packet B is similarly converted to packet B' to travel over the network in a secure manner and to be converted back to packet B at the destination machine. In this manner, IPsec can be implemented transparently, that is without the knowledge or interference of the system of origin or the destination system which each deal only with a standard IP packet.

Figure 2C:
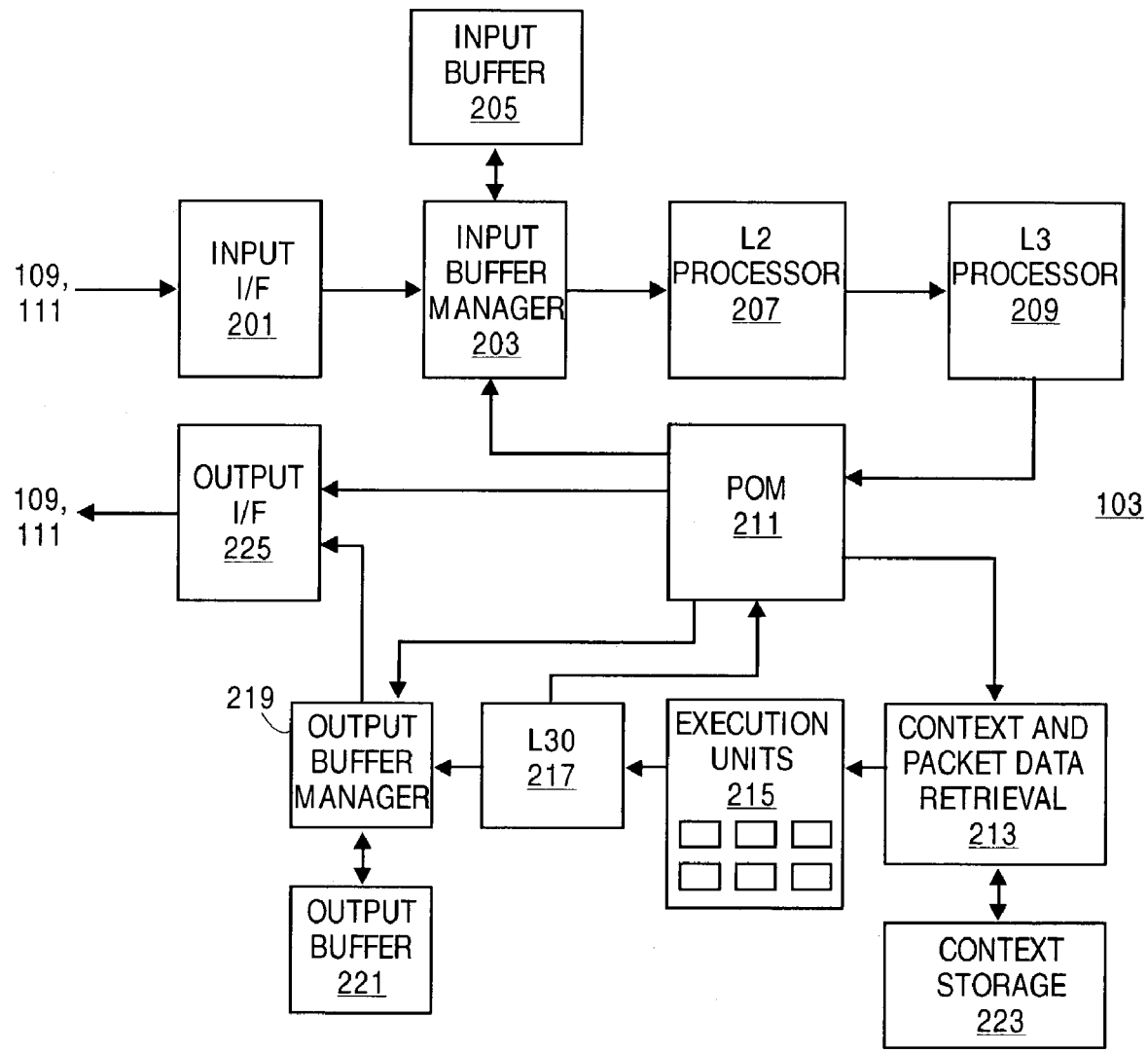
FIG. 2C is a block diagram of an exemplary security processor.

FIG. 2C is a block diagram of an exemplary security processor 103 for use in an inline configuration. Packets are received by security processor 103 through input interface 201 from physical connection 109. Input interface 201 forwards incoming packet data to input buffer manager 203. Input interface 201 may receive packets via SPI, PCI, PCI-Express or similar systems. Input interface 201 may check cyclical redundancy check (CRC) data for a packet and similar information such as SPI error, virtual port and length information. In one embodiment, when an error is detected the incoming packet is dropped. In another embodiment, the incoming packet is forwarded to an exception port. In one embodiment, input interface 201 may support thirty two SPI input ports. In another embodiment, PCI, PCI Express or similar systems may also be supported by input interface 201.

Input buffer manager 203 stores the incoming packet in input buffer 205. In one embodiment, input buffer 203 manager forwards a portion of an incoming packet to a level two (L2) processor 207. Level two refers to data link layer protocols from the Operation System Interconnection (OSI) model. In another embodiment, input buffer manager 203 forwards a pointer or tag identifying the packet to the L2 processor 207. Pointers may include a pointer to a header, tail, tail—1, payload and similar segments of a packet. Input buffer manager 205 manages the free space of the input buffer 203. Input buffer manager 205 maintains the input buffer 203 using linked lists or similar data structure to track the free blocks in the buffer 203. In one embodiment, the block size is 256 bytes.

L2 processor 207 parses the header information of an incoming packet. L2 processor 207 determines if the incoming packet has any level 2 headers or encapsulation. L2 processor 207 forwards the pointers it received to the Level 3 (L3) processor 209 along with any level 2 information it has discovered. L3 processor 209 determines if the packet contains Internet Protocol (IP) and Internet Protocol Security (IPsec) header information or other OSI level 3 data or protocols, such as IPX within it. L3 processor 209 also parses TCP/UDP headers then extracts and classifies relevant information for later use. If IPsec header information or other IPsec data is detected within a packet this information along with the other data accumulated related to the packet is forwarded to the packet order manager (POM) 211. Packets that do not contain IP or IPsec data are forwarded to the POM 211 to be sent to an appropriate destination port. L3 processor 209 also extracts an SA index from the IPsec header information in the packet to pass onto POM 211.

L3 processor checks for exception cases for the packet. L3 input processor 209 checks for IP checksum errors, malformed packets, IPv4 or IPv6 with options and similar packet abnormalities that require the packet to either be passed to an exception port or similar handling mechanism. Also, L3 input processor 209 can redirect packets matching a configured protocol header value or UDP port to either a particular exception port or execution unit group. L3 processor 209 passes on packet data to POM 211 in input packet completion order.

L2 processor 207 and L3 processor 209 parse packets to determine if they need to be processed by an execution unit 215 or passed through security processor 103 without being processed. In one embodiment, L2 processor 207 and L3 processor 209 can process packet headers 64 bits per cycle. In one embodiment, L2 processor 207 and L3 processor can parse layer 2, layer 3, and layer 4 IP packet information. In another embodiment, the parsing of L2 and L3 headers may be done in a single unit, distributed over several specialized units or accomplished by a general processor or set of general processors such as execution unit 215.

POM 211 maintains relative order in the processing of packet data. Information regarding packets identified through data obtained by the L2 processor 207 and L3 processor 209 as containing IPsec data to be decrypted are forwarded to context retrieval system 213. Other packets are forwarded to the output interface 225 to be sent out on a destination port or an exception port. POM 211 maintains in flight information about packets as they are being queued or processed. POM 211 schedules packets for execution units 215. POM 211 stores the information needed to extract the packet from the input buffer 205 together with the information gathered from L2 processor 207 and L3 processor 209. In one embodiment POM 211 manages a buffer that can track 2048 packets at a given time. POM 211 also forwards packets information that does not require processing to the output interface 225 from input buffer 205. Actual packet data is maintained in either the input buffer 205 or output buffer 221, other devices such as POM 211 pass pointers, addresses or tags identifying the location of the packet data to other components.

POM 211 also supplies the information needed by context retrieval 213 to retrieve the appropriate SA context information for use by execution unit 215. POM 211 receives information about the packet produced by execution unit 215. After a packet has been processed by security processor 103 and is queued for outbound transmission, POM 211 directs the ordering of packet transmission. In order to accomplish its various functions, POM 211 maintains internally the information required to locate and manipulate the packets stored in the input buffer 205 and output buffer 221, as well as other control information specific to the packet while it remains in the security processor 103. POM 211 also maintains data required to order the packets relative to one another in terms of their arrival time.

Context and data retrieval system 213 accesses memory and context storage 223 to access security access information associated with a packet for use by an execution unit 215. In IPsec, cryptographic context information is required per security association (SA). The context may contain secret keys needed for symmetric encryption and authentication, as well as information regarding replay, sequence number, SA lifetime and confidentiality. Context memory 223 can also be used as general purpose memory. Context and data retrieval system 213 in conjunction with POM 211 loads packet data into execution unit 215 along with security association context information. In one embodiment, context memory is an external memory device such as a double data rate (DDR) random access memory unit or similar device. In another embodiment, context memory is an internal memory device or set of memory devices, caches or similar storage structures.

Execution units 215 decrypt or encrypt a packet by applying the IPsec transforms according to RFC 2401. In one embodiment, execution units 215 also adjust the L2 header and trailer information to reflect the new length of a packet after decryption or encryption. In one embodiment, security processor 103 may include twenty-four execution units. Execution unit 215 output is stored and output buffer 221 and a point or address is then forwarded to the L3 output processor 217.

In one embodiment, the execution units 215 are microcoded engines that support many cryptographic primitives, including direct hardware support for symmetric encryption algorithms such as DES/3DES, AES and RC4, direct support for MD5 and SHA-1 cryptographic hash, as well as asymmetric encryption algorithms such as RSA. In another embodiment, execution units 215 are customized to execute particular protocols such as IPsec. Execution units 215 may also utilize layer three parsed information to determine packet processing requirements. Execution units 215 may use context storage memory 223 as scratch memory to process an input packet.

L3 output processor 217 evaluates an output packet to determine if level three data (based on the OSI model) is accurate and internally consistent. L3 output processor 217 may also parse TCP and UDP headers to extract information for use in subsequent processing. L3 output processor 217 also checks for IP checksum errors, malformed packets, IPv4 or IPv6 with options and similar packet abnormalities that require the packet to either be dropped or passed to an exception port or similar handling mechanism. In one embodiment, L3 output processor 217 or similar device may also modify level two information to reflect changed packet size or similar changes to the level two packet data.

In one embodiment, L3 output processor 217 may check an encrypted or decrypted packet to determine if special circumstance apply that require further processing of a packet, such as IP in IP encapsulation, nested or bundled IPsec segments and similar scenarios where the packet requires additional processing. Packets requiring further processing have their pointer and tag information forwarded to POM 211. Packet pointer data for packets that do not require further processing are forwarded to output buffer manager 219.

Output buffer manager 219 stores packets or packet pointer and tag data in output buffer 221. When output interface 225 is ready to transmit the packet output buffer manager 219 forwards the packet data to the interface 225. Output buffer manager 219 manages the free memory space of the output buffer 221. In one embodiment, output buffer manager uses linked lists or similar data structures to track free memory space in output buffer 221. In one embodiment, the free memory space is tracked in 256 byte blocks. Output interface 225 may collect statistical data and append a CRC code to an outgoing packet. In one embodiment, output interface 225 may support thirty-two SPI ports. In another embodiment, PCI, PCI Express or similar systems may also be supported by output interface 225.

Figure 3:
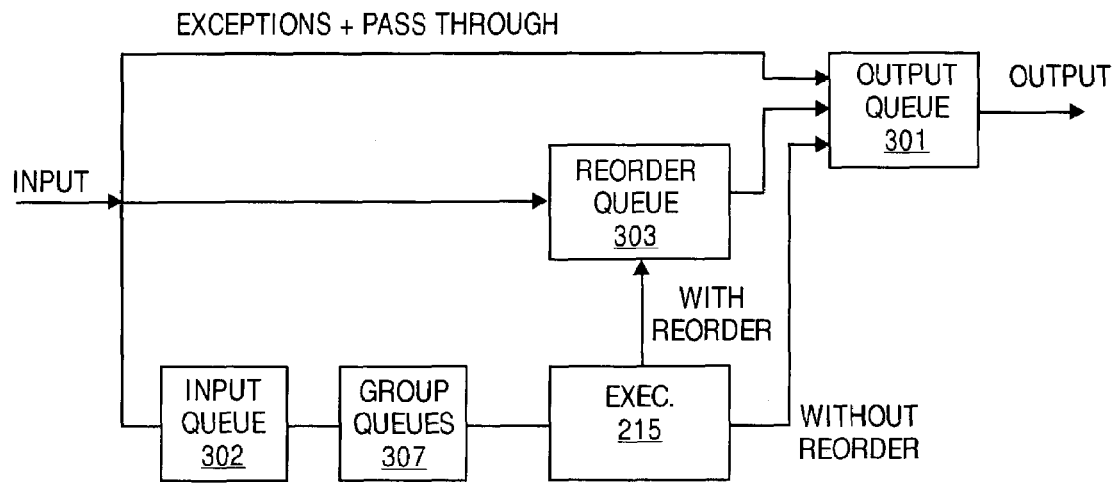
FIG. 3 is a block diagram of basic packet routing in the security processor.

FIG. 3 is a diagram of an exemplary packet flow through security processor 103. Incoming packets are analyzed to determine if they are valid or contain recognized protocol layer types. If packets do not require processing or are not from recognized protocol types then these packets are passed through to the output queue 301 to be output on a destination port or exception port. In one embodiment, the output queue is part of the output buffer 221 and output interface 225. Some 'pass through' packets will be forwarded to a reorder queue 303 in order to maintain the proper sequence or correct the sequence of packets to be transmitted. Reorder queues 303 maintain the per port order of packets while the packet is processed by security processor 103.

Packets identified as requiring processing are forwarded to input queues 305. In one embodiment, the input queues 305 are implemented in input interface 201 or input buffer 205. These packets are further processed and may be forwarded to group queues 207 that categorize the packets by destination, source, type, designated execution unit 215 or similar criteria. Input queues 205 buffer data related to input packets that are waiting to be processed by an execution unit 215.

In one embodiment, group queues 207 are implemented in POM 211. Packets are then processed by the execution unit 215 when they reach the head of their queue. Packets are assigned to execution units 215 based on the group of the required operation. In one embodiment, eight different groups are supported. An execution unit 215 may support any single group or any combination of groups. Packets are forwarded after processing to a reorder queue 303 in order to maintain or correct packet sequence or are directly forwarded to output queue 301. Output queues maintain the order of result packets that have completed their execution unit 215 processing requirements and satisfy all other ordering requirements.

This set of queues allows several different IPsec ordering implementations to be used. In one embodiment, the reorder queue 303 is implemented through POM 211 maintaining a set of pointers or tags for the packets stored in input buffer 205 and output buffer 221 in proper order.

In one embodiment, IPsec applications may require per-port ordering guarantees. Security processor 103 can guarantee that all single packets that enter and exit with the same input and output ports will exit the security processor 103 in the order that they enter the processor 103. In another embodiment, an IPsec implementation allows pass through traffic to bypass the reorder queue 303. This maintains the ordering of IPsec packets and maintains the ordering of non-IPsec packets but not the overall ordering of packets. In a further embodiment, the reorder queue is not used and packet order is not guaranteed.

Figure 4A:
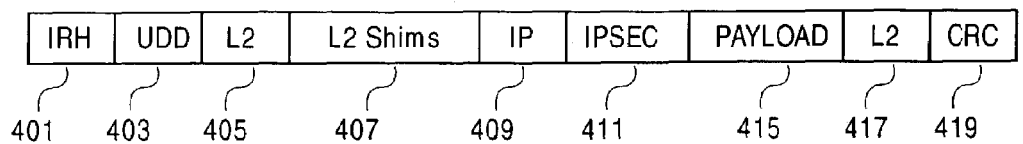
FIG. 4A is a diagram of a packet format.

FIG. 4A is a diagram of an exemplary packet 400 to be processed by security processor 103. Packet 400 may include a proprietary header 401, which contains data about the packet and complementary user defined data (udd) section 403. Proprietary header 401 and udd 403 sections may be used for providing additional information and data between a security processor 103 and a network processor 105 or other programmable system device.

Packet 400 includes a level two protocol header 405 and may include level two 'shims' header information 407 such as Point to Point over Ethernet (PPoE), Multi-Protocol Label Switching (MPLS) and similar systems. A level two header field may not exist in a packet, depending on the packet opcode. Security processor 103 supports programming as to which level two headers parsed or detected by the security processor 103. A packet may include a set of IP 411 and IPsec 411 headers identifying the destination of payload 415 and the relevant security association for packet 400 respectively. An IP header may not exist in a packet, depending on the packet opcode. Packet 400 may also include level two protocol tail information 417 and a cyclical redundancy checking (CRC) field 419. ATM related packets may have a significant trailer.

Figure 4B:
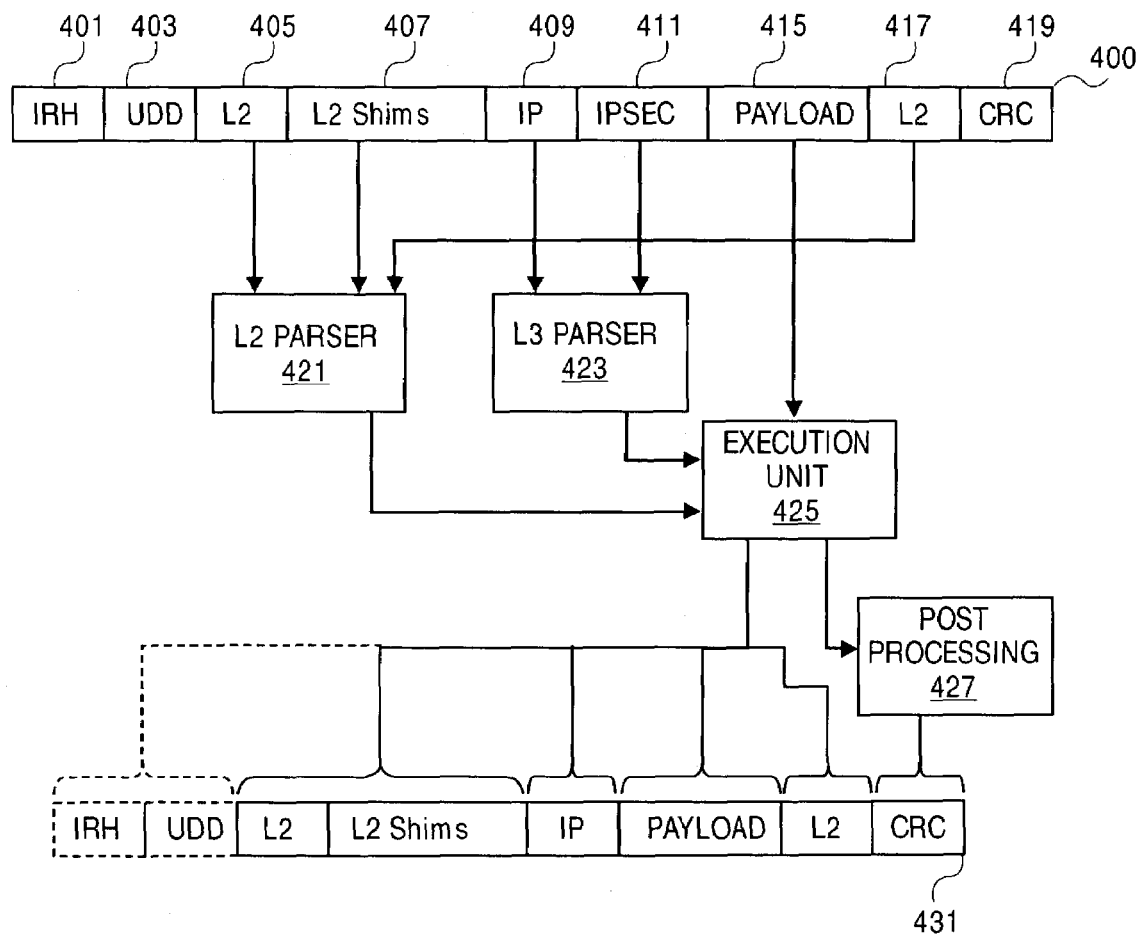
FIG. 4B is a flowchart of a protocol parsing system.

FIG. 4B is a flow chart of packet parsing and reassembly enabled by security processor 103 that provides transparent operation in processing between a framer 101 and network processor 105. Initial packet 400 may include proprietary header 401 and data 403 fields. These fields may be used to communication information between 'smart' devices such as security processor 103 and network processor 105 between which an established format for these headers and data can be established. In one embodiment, a packet will not include the proprietary header 401 and data 403. This header 401 and data 403 may be added if the packet is to be forwarded to a smart device. In another embodiment, a packet 400 will include proprietary header 401 and data 403, but is to be forwarded to a dumb device, e.g. a framer 101. The header 401 and data 403 are stripped from the packet.

In one embodiment, packet 400 includes level two header information. This information is analyzed by a level two (L2) parsing system 421. In one embodiment, L2 parsing system 421 analyzes the L2 header 405, L2 shims 407, and L2 tail data to determine the protocol type and information encoded in these fields. In one embodiment, L2 parsing system may directly transfer this information to reassemble these sections of a processed packet 431. In another embodiment, the level two parsing system 421 passes on the information decoded from the L2 405 and L2 shims 407 fields, if present, to an execution unit 425. In one embodiment, L2 parsing system 421 may be partially or completely implemented through a device such as L2 processor 207.

In one embodiment, initial packet 400 is analyzed by a level three (L3) parsing system 423. The L3 parsing system 423 determines the types of level three protocols present in packet 400, e.g., IP header 409 and IPsec header 411 information, and what data may be encoded therein. In one embodiment, L3 parsing system 423 may directly transfer header information to reassemble the level three section of processed packet 431. In another embodiment, L3 parsing system passes the decoded information to an execution unit 425. In one embodiment, L3 parsing system 423 may be partially or completely implemented through a device or set of devices such as L3 processor 209 and L3 output processor 217.

Execution unit 425 may receive level two and level three information from the respective parsing systems. Execution unit 425 is primarily responsible for performing an operation on packet 400, e.g., a decryption operation on IPsec payload 415. Execution unit may receive information relevant to the operation to be performed on packet 400 from the data provided L2 and L3 parsing systems 421,423. After completion of the operation on packet 400, execution unit may directly pass modified data to reassemble processed packet 431. In another embodiment, execution unit 425 passes processed data to a post processing system or logic to reassemble the processed packet 431, including data received from L2 parsing system 421 and L3 parsing system 423. In a further embodiment, execution unit 425 may be primarily responsible for reassembly of packet 431 from processed data and data received from the parsing systems. In one embodiment, execution unit 425 may be implemented through a device such as execution units 215.

In one embodiment, post processing system 427 is primarily responsible for modifying packet 400 information to reflect packet modifications that result from the operation carried out by the execution unit 425. Post processing unit 427 may modify data in any of the fields of the processed packet 431 in order to ensure that packet 431 has accurate header and tail data. In one embodiment, post processing system 427 generates a new CRC and L2 value to reflect any changes in data and length in the packet 431. In one embodiment, post processing system may be implemented through a device or set of devices such as execution unit 215, L3 output processor 217 and output interface 225.

Figure 5:
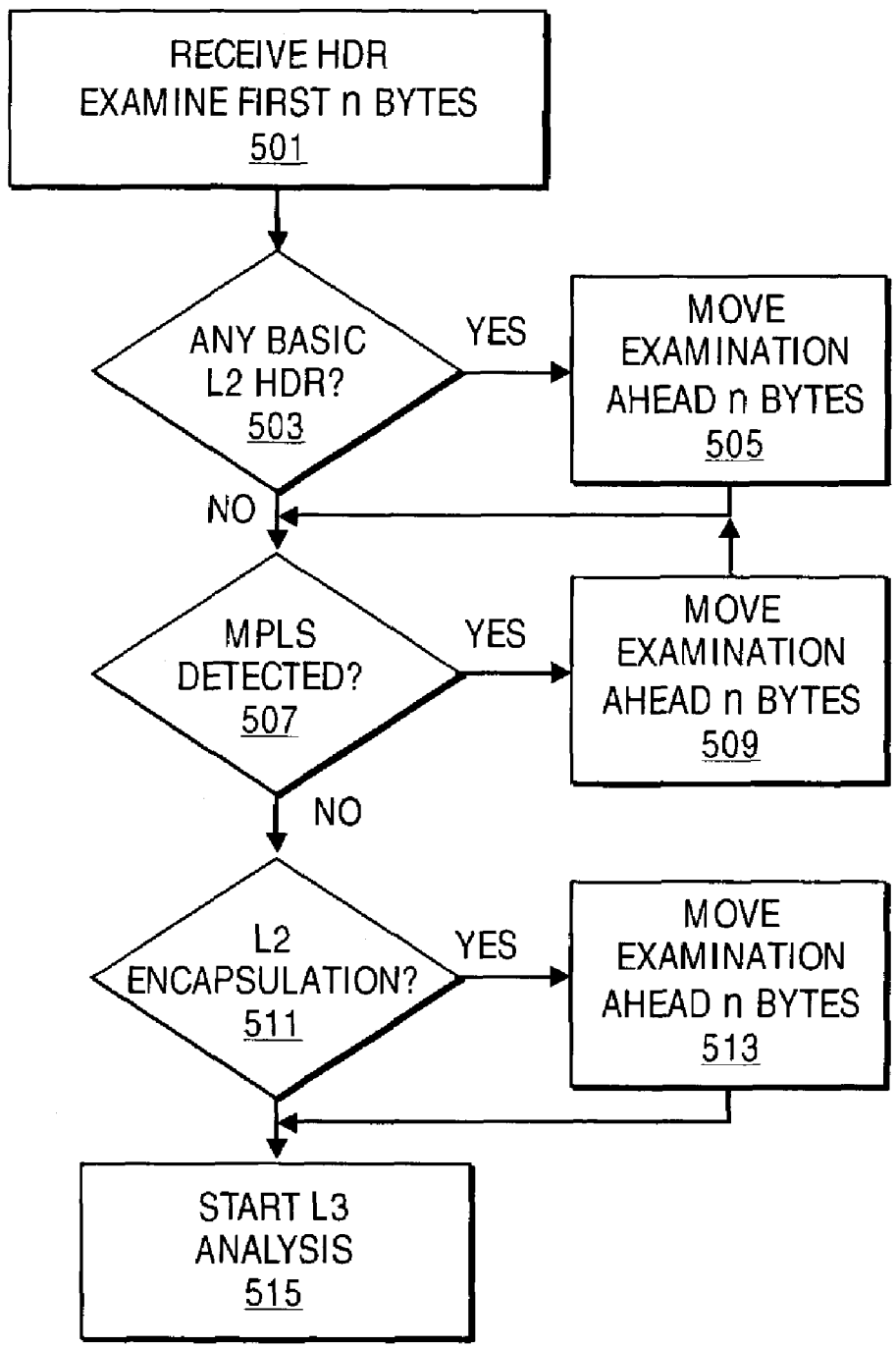
FIG. 5 is a flowchart of packet preprocessing.

FIG. 5 is a flowchart of the function of L2 processor 207. L2 processor 207 receives header information, pointers or tags for a packet from the input buffer manager 203 (block 501). In one embodiment, packets are not processed until the complete packet has been received and its CRC checked. In one embodiment, L2 processor 207 contains a set of comparators that pattern match a predetermined set of bytes from a level two header to find various types of level two headers and encapsulation. The comparators are maskable per bit, thus the comparators can be programmed to detect any bit sequence in a packet. In one embodiment, twenty pre-comparators and twenty post comparators are used. This configuration allows two separate sequential comparisons of the packet to be made to identify a set of headers. The first comparison by the pre-comparators a skip ahead in the packet based on the type of headers found and a second post-comparator comparison.

When a level two header exists, security processor 103 compares the first bytes of the input packet against configured pre-patterns. Each pattern is variable length and can be disabled. If no pre-patterns match the input packet, default information is used. The information stored with each pattern and the default information is configurable. If more than one pattern matches, the information associated with the first pattern that matched is selected. In one embodiment, the information selected by a pre-pattern match is: a skip count, which indicates the number of bytes in the packet to skip before further processing; a level two type, which is forwarded to the execution unit 215; execution units 215 disambiguate different level two types using this information; an IP field; an MPLS enable bit, which is set if MPLS is present after the skipped bytes; and a post comparator enable mask, which enables a post comparator if its corresponding bit is set. Pre-pattern match results determine how the L2 processor 207 interprets the subsequent bytes in an MPLS stack. The logic for skipping an MPSL stack skips all of the stack except the last entry. In one embodiment, L2 processor 207 supports a configurable maximum MPLS stack depth for error checking. The information checked and gathered in subsequent compares is similar to that in the first compare.

L2 processor 207 checks if a given level 2 header is present (block 503). If a level two header is found then the pattern matching skips ahead a predetermined number of bytes usually based upon the length of the type of header found (block 505). L2 processor 207 then checks for an MPLS stack (block 507). This process then repeats until each MPLS section including the pre-MPLS and post-MPLS patterns are found. L2 processor 207 moves its search ahead a predetermined number of bytes dependent on the size of the MPLS segment identified before continuing its search (block 509).

L2 processor 207 continues parsing the packet to determine if level two encapsulation is present (block 511). If this encapsulation is found then the pointer into the packet is advanced a predefined number of bytes based on the size of the encapsulation section (block 513). In the process of parsing the level two information, L2 processor 207 also determines the starting position of the IP packet within the larger packet. If the packet does not contain an IP packet then further processing of the packet is not needed by the security processor 103 and the packet information can be forwarded to a destination or exception port. If an IP packet is present then the packet information is passed on along with the level two information found to the L3 processor 209.

Figure 6:
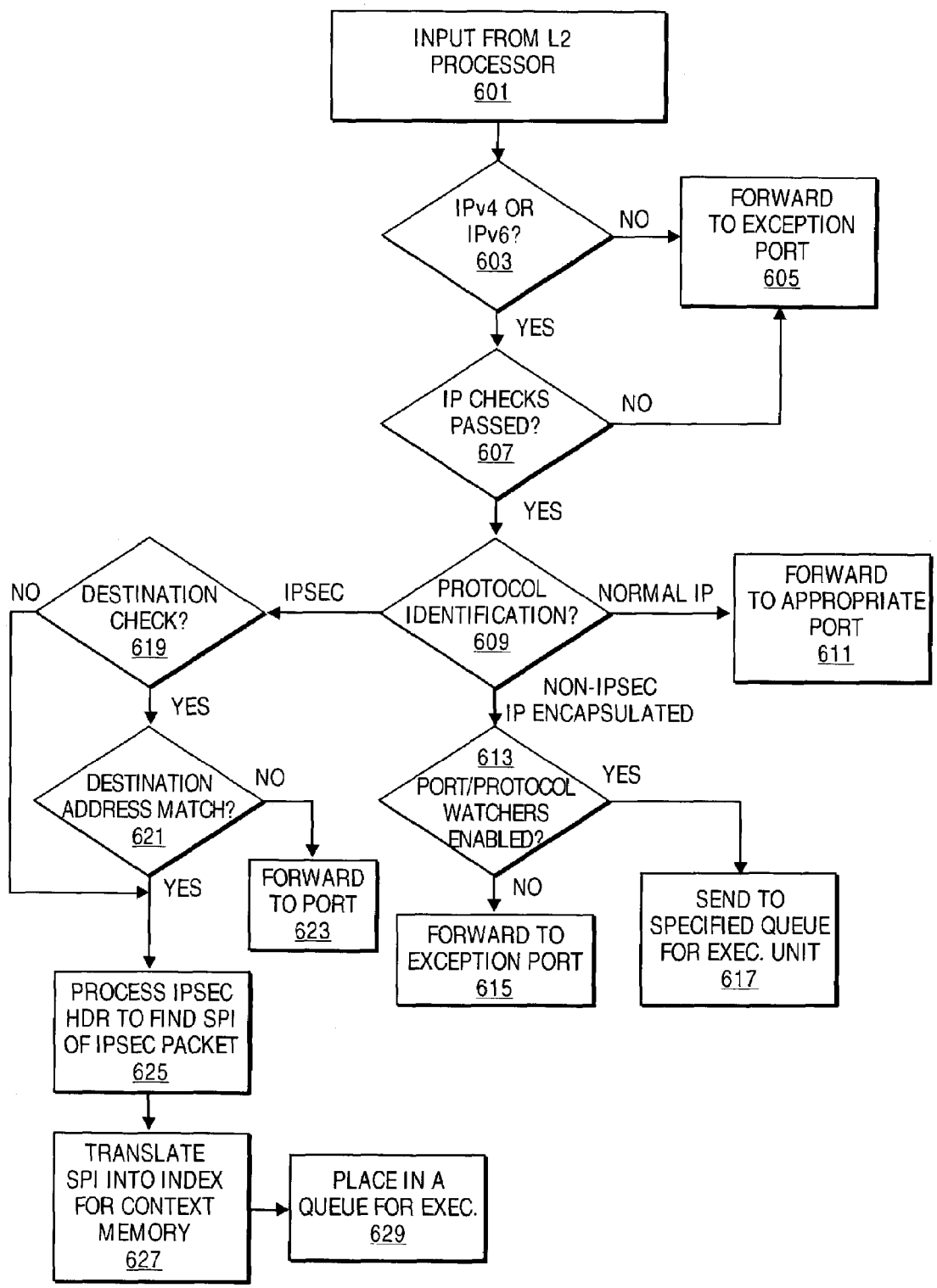
FIG. 6 is a flowchart of packet decryption and postprocessing.

FIG. 6 is a flowchart of exemplary L3 processor 209 function. L3 processor receives a pointer, tag or packet information from L2 processor 207 (block 601). L3 processor 209 checks the packet to determine if it contains an IPv4 or IPv6 packet (block 603). If neither of these formats are present then the packet is forwarded to an exception port (block 605). L3 processor 209 then verifies the IP header information that has been detected (block 607). If the IP information is not accurate then the packet is forwarded to an exception port (block 605). L3 processor then identifies whether the IP packet is a normal IP packet, includes IPsec packet or contains a non-IPsec IP encapsulation (block 609).

A normal IP packet with no IP encapsulation is forwarded to an appropriate destination port (block 611). A non-IPsec encapsulated IP packet is examined to check if it contains special protocols or UDP/TCP ports configured to be detected for special handling (block 613). If the packet does not include a configured encapsulation identified by either its protocol type or port number then the packet is forwarded to an exception port (block 615). If the packet includes encapsulation that is configured for special handling then the packet is placed in a queue to be processed by an execution unit (block 617). In another embodiment, non-IPsec IP encapsulated packets are identified grouped and processed as normal IP packets are processed.

A packet that includes IPsec is checked for a destination port specified in the IP header (block 619). The destination port is checked to determine if the packet is destined for an IPsec gateway based on a configurable range of destination addresses in processor 103 (block 621). If the packet is not destined for an IPsec gateway then the packet is forwarded to the appropriate output port (block 623). A packet that is destined for an IPsec gateway has its IPsec header parsed to determine the security parameter index (SPI) contained therein (block 625). L3 processor then translates the SPI into an index for a SA context in memory 223 (block 627). This information is then forwarded to a queue for processing by an execution unit 215 (block 629).

Figure 7:
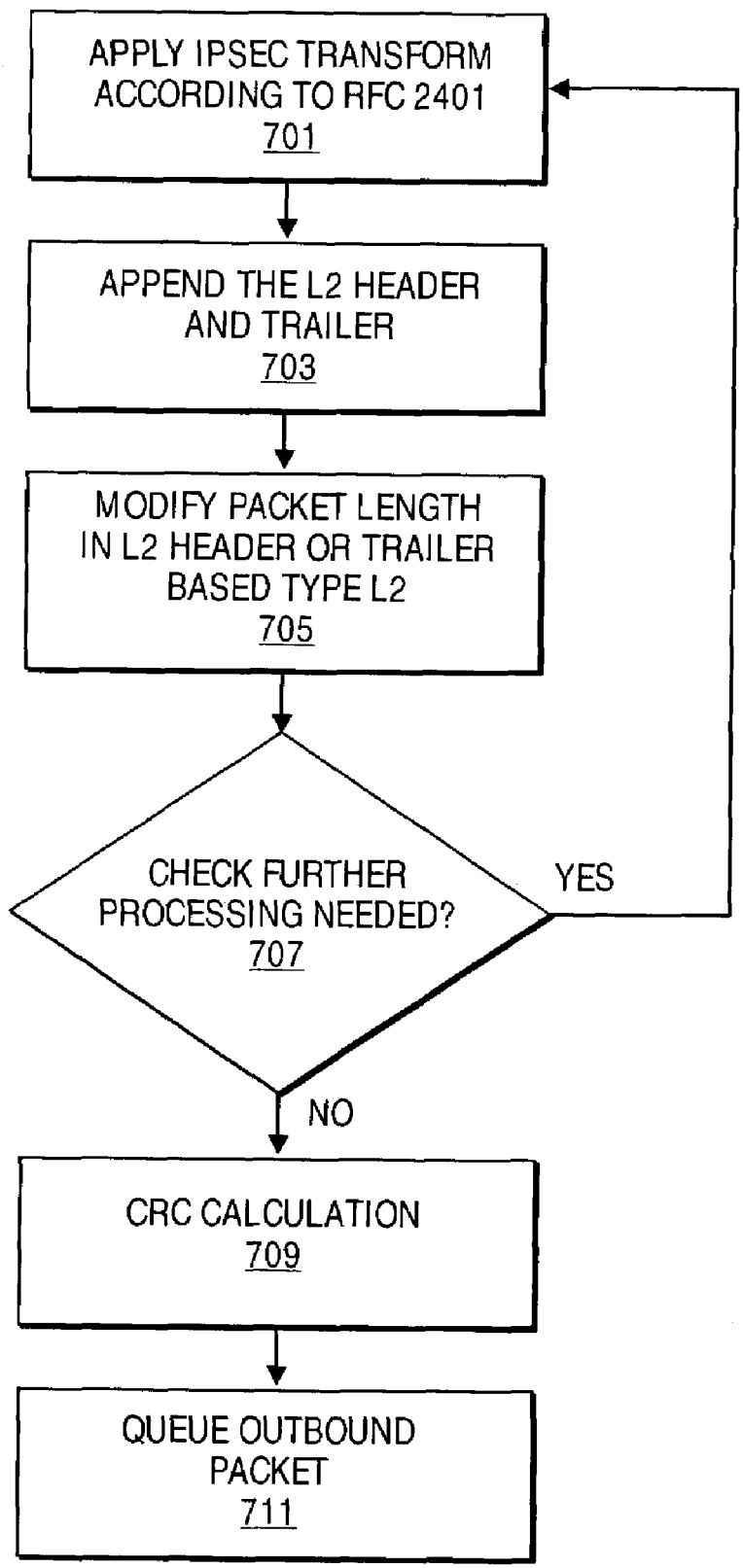
FIG. 7 is a flowchart of packet encryption.

FIG. 7 is a flowchart of one embodiment for processing of packet information by an execution unit 215 and subsequent processing by the L3 output processor 217. Execution unit 215 receives a packet for processing from POM 211 and SA context data and packet data retrieval system 213 after the packet is processed by the L2 and L3 processors 207,209. Execution unit 215 applies an IPsec transform on the encrypted data in the packet in accordance with RFC 2401 (block 701). Execution unit 215 then rebuilds the packet by appending the L2 header information identified by the L2 processor to the decrypted IPsec section along with level two trailer information (block 703). Execution unit 215 modifies the packet length information, if necessary in the L2 header or trailer information (block 705). In one embodiment, microcode in the execution unit 215 determines what level two header changes are required. For example, an IEEE 802.3 packet have a length field that may need to be modified by execution unit 215 to produce a proper packet. Also, an execution unit may need to calculate and add 'pad' (meaningless data included to meet a size requirement) to the end of a packet and insert a length field.

L3 output processor 217 checks the packet generated by the execution unit 215 to check if a decapsulated or decrypted packet is a valid IP packet. If the packet is a valid IP packet then it the packet is placed in the output queue by POM 211 or it is sent to the appropriate exception port.

In one embodiment, reassembly of a packet after parsing and decrypting is primarily done by the execution unit 215 before being sent to the L3 processor 217. In another embodiment, reassembly may be carried out by a dedicated device e.g., an output processor, a distributed system wherein multiple devices construct the various fields of the packet, e.g., L2 processor 207 creating the L2 data, L3 processor 209 or L3 output processor 217 creating the L3 data, or analogous devices to generated the fields necessary to create a processed packet that has accurate header and tail data and therefore allows security processor 103 to transparently operate in an inline fashion between a framer 101 and a network processor 105.

A CRC is calculated and appended to the decrypted packet (block 709). In one embodiment, the CRC field is generated by the output interface 225. In another embodiment, the CRC field is generated by execution unit 215, L3 output processor or equivalent structure. The output interface and execution unit 215 are programmable to implement various CRC standards that use the same generator polynomials. The outbound packet is then queue for transmission (block 711).

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
a security processor to be inline between a framer and a network processor, the security processor to intercept data traffic between the framer and network processor and to process an IPsec protocol layer in the data traffic transparent to the framer or network processor without terminating any other protocol layer in the data traffic and to identify IPsec frames within the data traffic to process.

2. The apparatus of claim 1, wherein the security processor decrypts an IPsec protocol layer.

3. The apparatus of claim 1, wherein the security processor creates an encrypted IPSEC protocol layer.

4. An apparatus comprising:
a first circuit to determine a protocol type of a packet;
at least one execution unit coupled to the first circuit, the at least one execution unit to decrypt an encrypted protocol layer of the packet;
a second circuit to correct protocol layer data after decryption to reflect changes to the packet caused by the decryption; and
a third circuit coupled to second circuit to communicate with a framer.

5. The apparatus of claim 4, further comprising:
a fourth circuit coupled to the first circuit to determine whether a packet contains an encrypted protocol layer.

6. The apparatus of claim 4, wherein the first circuit parses the packet to determine at least one level two protocol type.

7. The apparatus of claim 4, wherein the first circuit parses the packet to determine at least one level three protocol type.

8. The apparatus of claim 4, wherein the third circuit receives the packet from the framer.

9. The apparatus of claim 4, wherein the third circuit transmits the packet from the framer.

10. The apparatus of claim 4, further comprising:
a fourth circuit coupled to the second circuit to communicate with a network processor.

11. The apparatus of claim 4, wherein the second circuit alters length data in a protocol layer.

12. The apparatus of claim 4, further comprising:
a fifth circuit coupled to the at least one execution unit to retrieve a security association context from a memory device.

13. A method comprising:
receiving a packet;
parsing the packet to determine the level two protocol information in the packet;
processing an IPsec protocol layer of the packet;
altering the packet to correct header information to reflect the processing of the IPsec protocol; and
sending the packet to a framer device.

14. The method of claim 13, wherein the processing of the IPsec protocol layer includes decrypting the IPsec protocol layer.

15. The method of claim 13, wherein the processing of the IPsec protocol layer includes encrypting the IPsec protocol layer.

16. An apparatus comprising:
means for receiving a packet;
means for parsing the packet to determine the level two protocol information in the packet;
means for processing an IPsec protocol layer of the packet;
means for correcting protocol layer information after processing the IPsec protocol layer to reflect changes based on the processing; and
means for sending a packet to a framer device.

17. The method of claim 16, further comprising:
means for retrieving a security association context from a memory device.

18. The method of claim 16, wherein the means for correcting protocol layer information include creating level two protocol information for the packet from parsed information and information modified after processing of the IPsec protocol layer.

19. A system comprising:
a framer device;
a network processor; and
a security processor couple between the framer device and the network processor, the security processor to process an IPsec protocol layer transparent to the network device and framer without terminating any other protocol layer and to adjust header data to reflect IPsec processing.

20. The system of claim 19, further comprising:
a memory device to store security association context data, the memory device coupled to the security processor.

21. The system of claim 19, wherein the security processor decrypts the IPsec protocol layer.

22. A machine-readable medium that provides instructions, which when executed by a machine cause the machine to perform operations comprising:
processing a packet received from a framer device by a security processor coupled to the framer to determine a type of protocol layers including identifying an IPsec protocol layer in the packet;
processing the packet to decrypt the IPsec protocol layer;
modifying the packet to generate a modified packet including a decrypted IP protocol layer and protocol layer information based on the decrypted IP protocol layer and
sending the modified packet from the security processor to a network processor.

23. The machine-readable medium of claim 22, wherein the modifying the packet includes generating level two protocol layer information with a length including the size of the decrypted IP protocol layer.

24. The machine-readable medium of claim 22, further comprising:
generating a CRC field for a modified packet including a decrypted IP protocol layer.

* * * * *

UNITED STATES PATENT AND TRADEMARK OFFICE
CERTIFICATE OF CORRECTION

| | | |
|---|---|---|
| PATENT NO. | : 7,398,386 B2 | Page 1 of 1 |
| APPLICATION NO. | : 10/411909 | |
| DATED | : July 8, 2008 | |
| INVENTOR(S) | : Richard E. Kessler et al. | |

It is certified that error appears in the above-identified patent and that said Letters Patent is hereby corrected as shown below:

In the claims

Claim 17, Column 12, Line 16, delete "The method", and insert -- The apparatus --; and Claim 18, Column 12, Line 19, delete "The method", and insert -- The apparatus --.

Signed and Sealed this
Tenth Day of November, 2015

Michelle K. Lee
*Director of the United States Patent and Trademark Office*